US005327257A

United States Patent [19]

Hrytzak et al.

[11] Patent Number: 5,327,257

[45] Date of Patent: Jul. 5, 1994

[54] METHOD AND APPARATUS FOR ADAPTIVELY INTERPOLATING A DIGITAL IMAGE

[75] Inventors: Randal K. Hrytzak, Vancouver; Alastair M. Reed, Delta, both of Canada

[73] Assignee: Cymbolic Sciences International Ltd., Richmond, Canada

[21] Appl. No.: 841,681

[22] Filed: Feb. 26, 1992

[51] Int. Cl.[5] .................... H04N 1/40

[52] U.S. Cl. .................... 358/447; 358/428; 358/448

[58] Field of Search .................... 358/447, 428, 448, 444, 358/445

[56] References Cited

U.S. PATENT DOCUMENTS 4,193,092 3/1980 Stoffel .................... 358/428
4,712,141 12/1987 Tomohisa et al. .................... 358/445

*Primary Examiner*—Edward L. Coles, Sr.
*Assistant Examiner*—Madeleine Nguyen
*Attorney, Agent, or Firm*—Elbie R. DeKock; John R. Uren

[57] ABSTRACT

Digital image processing apparatus for interpolating a digital input image into an interpolated output image, in one embodiment of the invention, comprises an input buffer (12) for accommodating pixel data of the input image and a coefficient buffer (14) for storing precalculated interpolation weighting coefficients prior to real time image interpolation. The coefficient buffer (14) comprises a first memory segment (22) for containing a set of precalculated sharp interpolating weighting coefficients obtained by using a sharp interpolating algorithm, a second memory segment (24) for containing a set of precalculated soft weighting coefficients obtained by using a soft interpolating algorithm and a third memory segment (26) for containing a set of precalculated weighting coefficients representative of a predetermined characteristic of the input image, such as contrast or density. The processing apparatus further comprises interpolation logic (16) for calculating a sharp interpolated output image pixel, a soft interpolated output image pixel, and a value for the image characteristic, using the input pixel data and the precalculated weighting coefficients, and an algorithm implementation controller (18) for calculating a resultant output pixel by combining the sharp and soft interpolated pixel values as a function of the image characteristic.

32 Claims, 12 Drawing Sheets

Input Image
Locate Position Within Image For Interpolation
Generate Interpolated Pixel Data Set
Generate Image Content Variables
Derrive Sharpness Scale Factor S from Prestored Lookup Table (s)
Soft & Sharp Bounds
Derive Resultant Output Interpolation Result P
Output Pixel Data

DENSITY TABLE

Table Name: c100d100.SHP

ESC to end

Date created: Tue Feb 11 10:18 AM 92

Description: This is full sharpness.

Using Ver: 3.00

DENSITY TABLE

Table Name: drohi.SHP

ESC to end

ENHANCED SHARPNESS

CYAN
MAGENTA
YELLOW

ENHANCED SMOOTHNESS

Low Density

High Density

Date created: Tue Feb 11 11:48 AM 92

Description: This is Density Roll-off (High)

Using Ver: 3.00

METHOD AND APPARATUS FOR ADAPTIVELY INTERPOLATING A DIGITAL IMAGE

FIELD OF THE INVENTION

This invention relates to a method of adaptively processing a digital input image into an interpolated digital output image, depending on image content, and an apparatus for carrying out the method.

BACKGROUND OF THE INVENTION

A major problem with any interpolation algorithm which produces a sharp result, i.e. cubic or higher polynomial, or a digital filter design, is that objectionable 'ringing', overshoot and undershoot will occur on high contrast edges in the image. Some degree of overshoot and undershoot is required on lower contrast edges to produce a visually pleasing result but this will produce objectionable 'ringing' on a high contrast edge.

The 'ringing' can be reduced by various methods. For example, a digital filter design using linear programming can be used to obtain a compromise between a sharp cut-off filter, to obtain a sharp image, and a certain amount of 'ringing'. However, since it is a compromise, reducing ringing on a high contrast edge will lead to subjectively less pleasing results in lower contrast areas of an image, i.e. the image will be less sharp overall.

Methods by which different interpolation algorithms can be used during an interpolation process have been suggested. For example, U.S. Pat. No. 4,468,693 describes interpolation hardware including a manually operated switch for switching between different available interpolation algorithms depending on the kind of image to be interpolated. U.S. Pat. No. 5,008,752 describes a system which incorporates a control unit which monitors the content of the input data and switches between interpolation kernels in an attempt to provide optimum interpolation for different types of image content. With this method, certain corrective measures need to be taken in order to compensate for the use of either the one or the other algorithm.

It is an object of the present invention to provide a continuum of interpolated output images ranging from relatively sharp at one end of the continuum to relatively soft at the other end so that the user has the ability to select any degree of sharpness (or softness) in interpolated output images within limits imposed by a predefined set of interpolation algorithm coefficients.

It is a further object of the invention to provide local image content adaptability to allow a user to specify or select the degree of sharpness (or softness) in the interpolated output image based upon local image characteristics, such as density and contrast.

In this specification the terms sharp and soft are used as direct opposites; i.e. 100% sharpness equals softness and vice versa. Furthermore the terms "soft" and "smooth" are used synonymously.

SUMMARY OF THE INVENTION

According to the invention, there is provided a method of processing a digital input image into an interpolated digital output image, comprising the steps of obtaining input pixel data of said input image; locating a local position within said input image for interpolation; obtaining a first interpolated output image pixel at a predetermined pixel position in said output image; obtaining a second interpolated output image pixel at said predetermined pixel position in said output image; deriving an input image characteristic value from said input image pixel data; and calculating a resultant output image pixel at said predetermined pixel position in said output image by combining said first and said second interpolated output image pixels as a function of said input image characteristic value. The method can be repeated by moving to the next local position in the input image and so on until the entire image has been interpolated, i.e. until a complete output image of the required size is produced.

The method may further comprise the steps of obtaining a third interpolated output image pixel at said predetermined pixel position in said output image; deriving a further input image characteristic value from said input image pixel data; and calculating a further resultant output image pixel at said predetermined pixel position in said output image by combining said first resultant output image pixel and said third interpolated output image pixel as a function of said further input image characteristic value. It will be appreciated that the last step is simply an iteration of the original calculation of the resultant output image pixel, and it may be repeated in further iterations, as required. This iteration method allows the boundaries of the interpolation range to be varied adaptively during an interpolation process depending on local or global image content or characteristics.

Further according to the invention, there is provided digital image processing apparatus for interpolating a digital input image into an interpolated output image, comprising an input buffer for accommodating pixel data of said input image; means for locating a local position within said input image for interpolation; means for obtaining a first interpolated output image pixel at a predetermined position in said interpolated output image; means for obtaining a second interpolated output image pixel at said predetermined position; means for deriving an input image characteristic value from said input image pixel data; and means for calculating a resultant output image pixel at said predetermined position in said output image by combining said first and second interpolated output image pixels as a function of said input image characteristic value.

The first interpolated output image pixel may be obtained by the application of a first interpolation algorithm producing a relatively sharp result and said second interpolated output image pixel may be obtained by the application of a second interpolation algorithm producing a relatively soft result.

The resultant output image pixel may be calculated by using the following algorithm:

$$P=SX+(1-S)Y$$

where P represents said resultant output image pixel; X represents said first or sharp interpolated output image pixel; Y represents said second or soft interpolated output image pixel; and S represents a scaling factor with a value of from 0 to 1, derived from said input image characteristic value.

Said further resultant output image pixel may be calculated by using the algorithm:

$$P'=S'W+(1-S')P$$

where P' represents said further resultant output image pixel; W represents said third interpolated output image pixel and S' represents a further scaling factor with a value from 0 to 1, derived from said further input image characteristic value.

The problems encountered by the known interpolation methods can be avoided or at least reduced by adaptively changing from a sharp to a smooth interpolation algorithm on high contrast edges, while maintaining a sharp result for lower contrast image detail. This can produce an image which is subjectively pleasing but without objectional "ringing" artifacts. This adaptive feature can also be used to control the sharpness of the interpolated image within local areas. In many images, one area will require sharpening, while another will require smoothing. This is difficult and time consuming to achieve in practise with the known methods, unless the interpolator can change from sharp to smooth adaptively or adaptively reduce or increase sharpness, as provided for in the present invention. For example, if a low contrast area requires smoothing, the relevant parameters can be selected appropriately to achieve this, while giving a sharp result elsewhere. An example of this would be an image with noisy shadow areas which require smoothing more than highlight areas with high frequency picture detail.

Further objects and advantages of the invention will become apparent from the description of preferred embodiments of the invention below.

BRIEF DESCRIPTION OF THE SEVERAL VIEWS OF THE DRAWINGS

Specific embodiments of the invention will now be described, by way of example only, with reference to the accompanying drawings, in which.

DESCRIPTION OF PREFERRED EMBODIMENT

Figure 1:
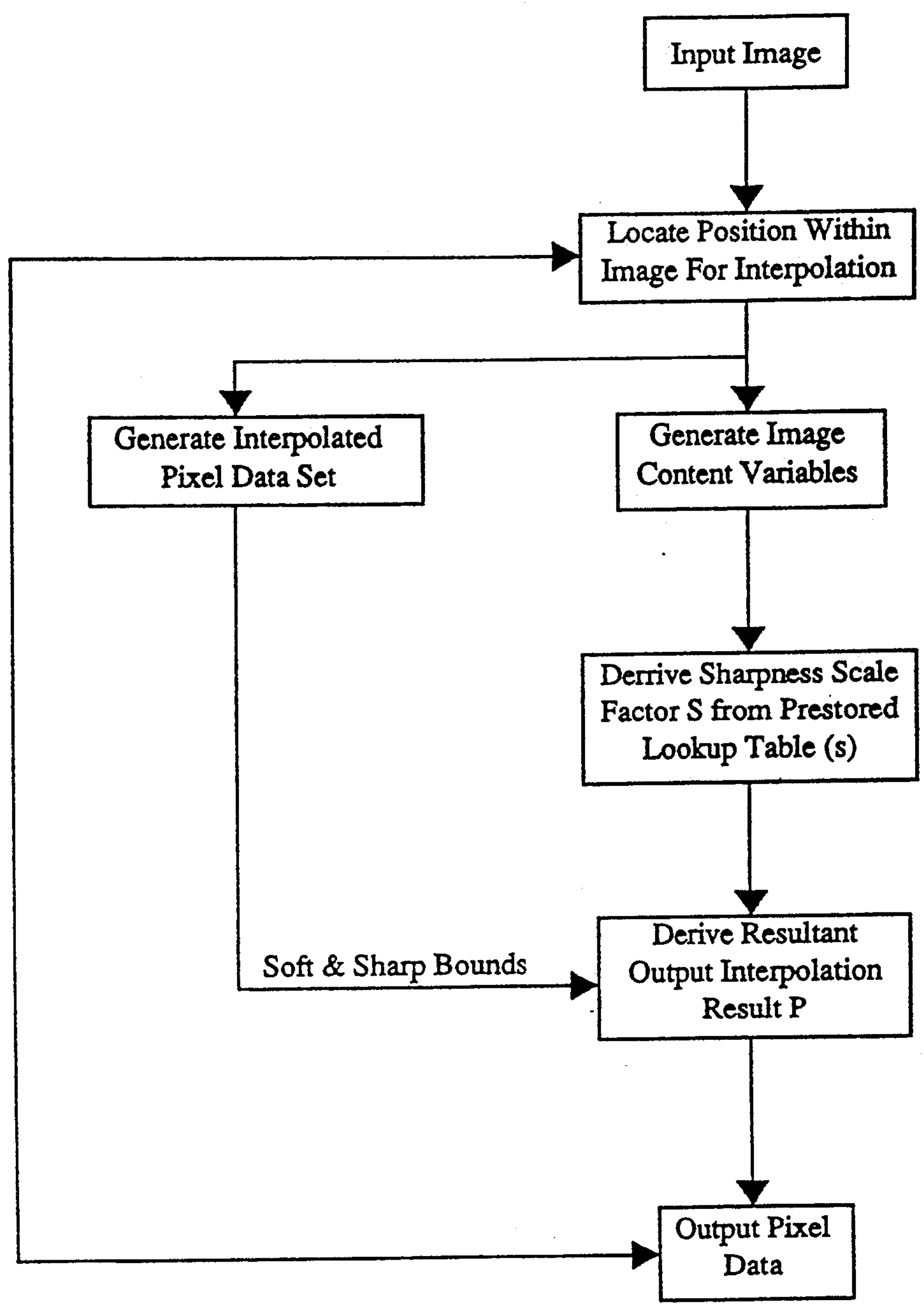
FIG. 1 is a flow diagram illustrating an interpolation method according to one embodiment of the invention.

Referring to FIG. 1, a flow diagram illustrating an interpolation method according to one embodiment of the invention is shown.

When dealing with a colored image, separate color channels will be involved, for example cyan, magenta, yellow and black. The following description describes the method for one color channel only. The method is duplicated for each color channel and any number of color channels can be accommodated.

As illustrated in the flow diagram, the interpolation method comprises the steps of (i) obtaining input pixel data;

(ii) locating a local position in the input image for interpolation;

(iii) using the input pixel data to generate an interpolated pixel data set comprising a sharp and a soft interpolated output image pixel (X,Y), respectively;

(iv) generating values for image content variables, which in the present example comprise image contrast and image density;

(v) deriving a sharpness scale factor S by the application of the image content variables to prestored lookup tables; and (vi) calculating a resulting output image pixel P by combining the sharp and soft interpolated output image pixels as a function of the scale factor.

The above method is then repeated by moving to the next local position in the input image for interpolation.

It should be noted that the reference to "sharp" and "soft" for the pixels X and Y, respectively, are relative terms, meaning that pixel X is sharp relative to pixel Y and pixel Y is soft relative to pixel X. Thus, in one application a pixel X' is sharp relative to a pixel Y', but both X' and Y' may be sharp relative to another set of pixels X" and Y" in another application.

During image interpolation, a 4×4 kernel of coefficients is convolved with the input image. For each output interpolated value, the spatial location of each output pixel in relation to the input pixels determines which specific coefficients are used. The spatial locations of the output pixels are determined by the desired interpolation factors specified for each of two output dimensions. Each position of the convolution kernel with reference to the input image is referred to as a "local position" in the input image. For a 4×4 kernel this "position" is comprised of a 16 pixel area.

In the present example, the sharp interpolation algorithm which is used for calculating the sharp interpolated output image pixel X is a two-dimensional digital filter, obtained using a standard filter design method, such as described by R. M. Mersereau (Two Dimensional Digital Signal Processing I, Edited by T. S. Huang, Springer-Verlag, New York 1981, "Two Dimensional Non-Recursive Filter Design"). This produces a sharp result with ringing on high contrast edges. The soft result is calculated by using a smooth filter in the form of a two-dimensional cubic spline with all positive weighting coefficients. This produces a smooth result with no ringing. The calculations are carried out by the use of precalculated weighting coefficients, as, for example, described in U.S. Pat. No. 4,578,812 to Yui.

The sharp and soft results are calculated at identical pixel positions in the output image.

The image contrast is derived by the use of contrast detector mask coefficients, in the present example, which are stored in memory and are fixed values to detect edges or contrast of an image. These values are:

| | | | |
|---|---|---|---|
| 1/16 | 1/16 | 1/16 | 1/16 |
| 1/16 | −15/16 | 1/16 | 1/16 |
| 1/16 | 1/16 | 1/16 | 1/16 |
| 1/16 | 1/16 | 1/16 | 1/16 |

This gives zero in a flat image area, a large positive value when centered at the bottom of an edge, and a large negative value when centered at the top of an edge. Thus the overshoot below an edge (black fringe), can be controlled separately from the overshoot above the edge (white fringe) by the application of an appropriate lookup table, such as the one illustrated in FIG. 9. This is important in practice since a white fringe is more objectionable in a transparency than a black fringe.

In the present example, a value for the image density is taken to be proportional to the local average image value, which is approximately represented by the soft interpolated output pixel value Y. This is done for reasons of speed optimization. The density measure can be generated in a manner similar to the contrast value above, i.e. by the application of density detector coefficients, if desired.

To obtain the scale factor S, the image contrast and density values are each used to reference a one-dimensional lookup table containing input to output relationships, such as those illustrated in FIGS. 6 to 11, and the resultant table values or weighting factors obtained, each with a value from 0 to 1, are then multiplied to produce the scale factor S.

The algorithm by which the interpolated output pixel P is derived adaptively is given by:

$$P=S\,X+(1-S)Y$$

where S is the scale factor, and X and Y represent relatively sharp and relatively soft output image pixels As stated a above, the terms "sharp" and "soft" are relative and they define the boundaries of a "sharpness continuum" within which the value of P is fixed according to the value of S.

The manner in which S is derived from the input image content is application dependent. For example, there may be one or more image characteristics which will influence the sharpness quality of the image. In addition, the number and nature of these characteristics may vary over the image. Therefore, derivation of S is locally adaptive, i.e. by generating image content variables at the local position where interpolation is taking place. Due to the subjective nature of its operation, the manner in which S is derived is ideally also user controllable. For example, in the case of a colored image, density measures are generated for each color channel involved. Rather than scaling these measures to directly generate the factor S for each channel, tables are used to specify the actual desired sharpness for particular density values. For example, it may be desirable to decrease the sharpness of an image in a high density cyan color area, which can be achieved by setting up the lookup table in an appropriate fashion.

Figure 2:
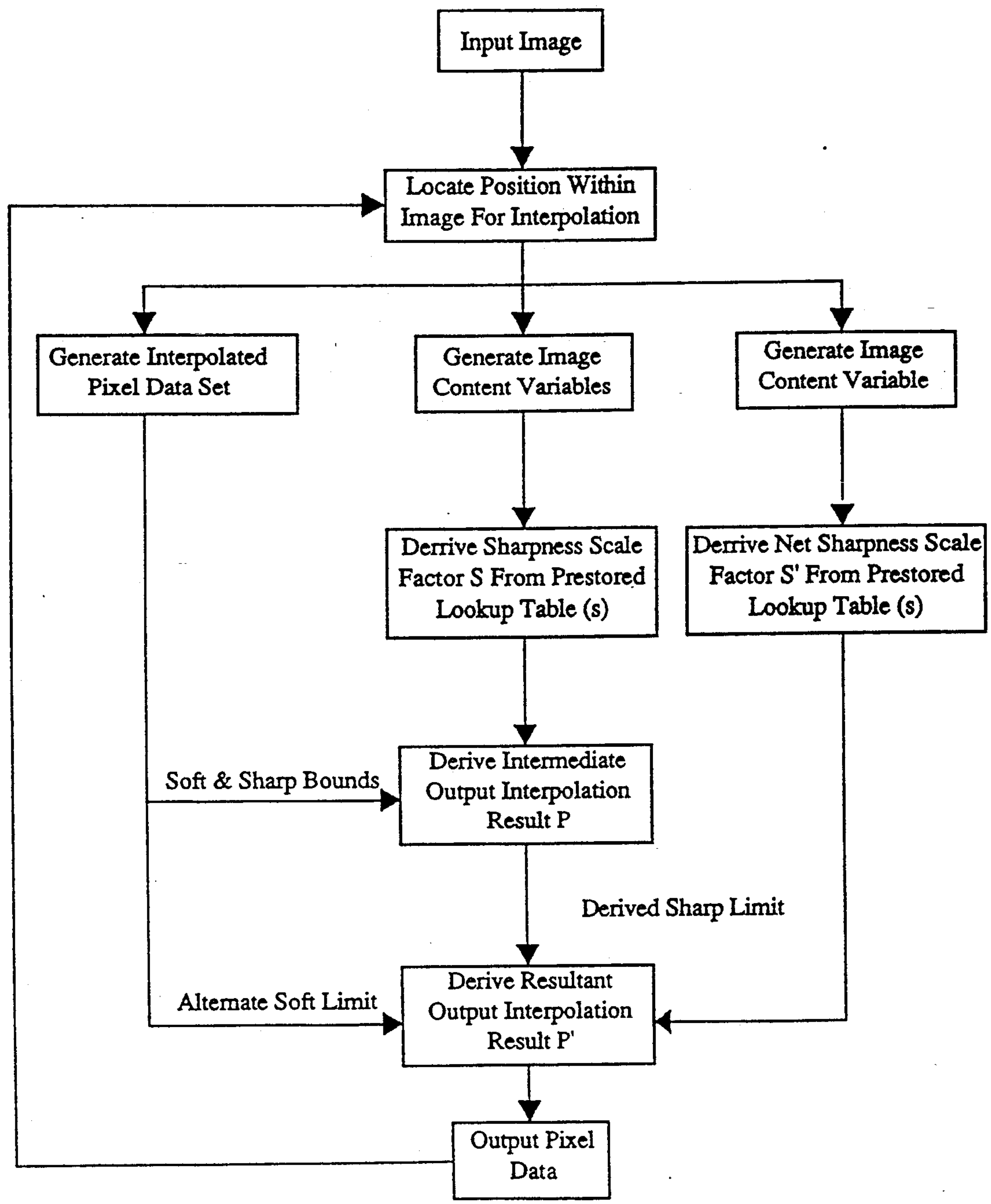
FIG. 2 is a flow diagram similar to FIG. 1 illustrating another embodiment of the interpolation method according to the invention.

With reference to FIG. 2, an alternative embodiment of the interpolation method according to the invention is illustrated.

According to this embodiment the resultant output pixel P is regarded as an intermediate value and a third interpolated output image pixel W is calculated from the input pixel data. One or more additional input image characteristic values are derived, depending on circumstances or requirements, and these additional image characteristic values are used to obtain a second scaling factor S'. A new resultant output image pixel P' is then obtained by using the algorithm:

$$P'=S'W+(1-S')P.$$

For example, in a particular application, the intermediate value P may be taken to represent a sharp value, defining the upper end of the sharpness continuum for interpolation, and the third interpolated value W will represent a value appropriate for digital descreening applications, defining a lower boundary of the sharpness continuum. Thus, provision is made for selection of the "interpolation range", i.e. the upper and lower value (X,Y) of the sharpness continuum is variable depending on the input image characteristics or other factors, as required by the user or as dictated by image content.

Alternatively, X and Y may each be selected from a group of M and N values, respectively:

$$X\epsilon\{X_0 \ldots X_M\}$$

$$Y\epsilon\{Y_0 \ldots Y_N\}$$

Any one element of each respective space may be selected as X and Y, as determined by global or local image content. In a specific example, X can be selected to be a sharp interpolated value and Y can be selected to be a soft interpolated value. Algorithms can be used to calculate X and Y to generate values of the desired sharpness or softness which can be prestored in an intermediate buffer.

Other expanded implementations in which the adaptive selection algorithm is again applied to P, when it is used as an intermediate value, may require another boundary value W such that:

$$W\epsilon\{W_0 \ldots W_P\}$$

Additional interpolation coefficients to generate W would then be prestored in a coefficient buffer. The specific algorithms used to generate the interpolation boundaries can vary based upon the image type and subjective requirements. A number of established methods could be used to generate any number of interpolated values. These values can then be combined in the fashion described above to derive a resultant output interpolation result.

Figure 3:
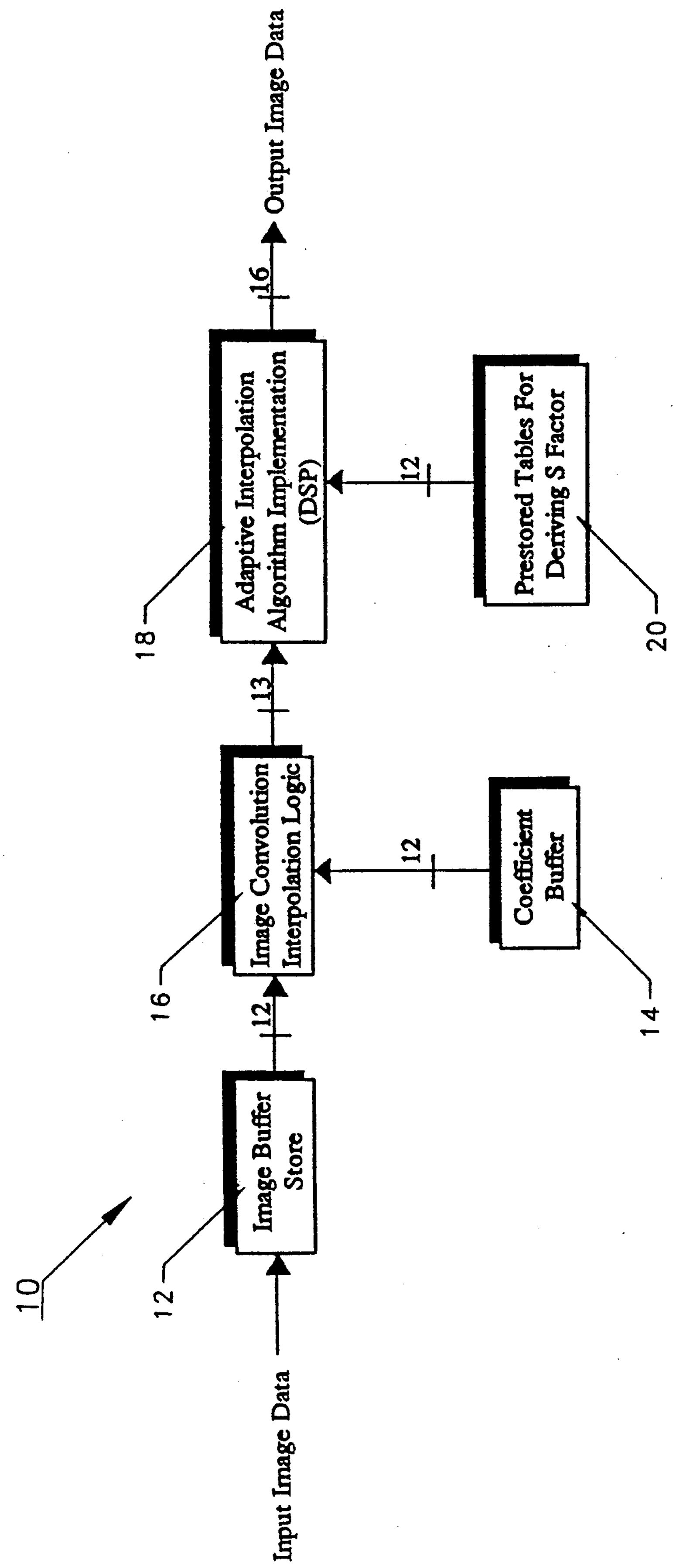
FIG. 3 is a block diagram illustrating interpolation apparatus according to the invention.

Referring now to FIG. 3, a diagrammatical illustration of an interpolation apparatus according to the invention is given. In the specific example described below, it will be assumed that three color channels are involved i.e. cyan, magenta and yellow (CMY).

The interpolation apparatus is generally indicated by reference numeral 10 and comprises an image storage or input buffer 12, a coefficient buffer 14, image convolution interpolation logic 16, an adaptive interpolation algorithm implementation or DSP (Digital Signal Processing) controller 18 and prestored lookup tables 20 for deriving the scaling factor S.

The DSP controller 18 implements the interpolation algorithm and the input buffer 12, the interpolation logic 16 and the coefficient buffer 14, as well as the lookup tables 20, to provide real-time image interpolation.

The input buffer 12 is implemented using a number of banks of Static Random Access Memory or SRAM integrated circuit components. Sufficient storage is provided to accommodate a number of lines of the input image.

The coefficient buffer 14 is implemented using a single bank of Dynamic Random Access Memory or DRAM integrated circuit components. The coefficient buffer 14 is used to store pre-calculated interpolation weighting coefficients prior to real-time image interpolation. During interpolation, specific sets of values within the memory are accessed for real-time image convolution. The manner in which these values are accessed is controlled by the interpolation logic 16. The implementation of the algorithm requires that three types of interpolation values be calculated independently, one for each color channel involved for adaptive selection.

Figure 4:
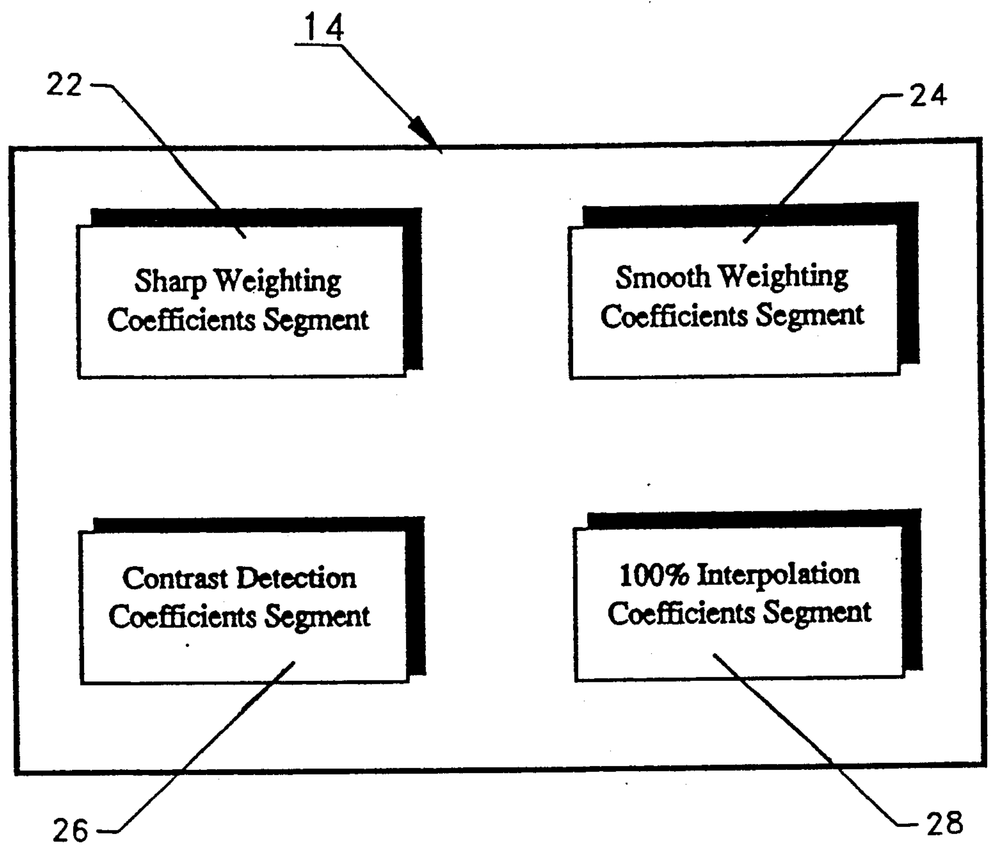
FIG. 4 is a diagrammatical illustration or a coefficient buffer which is used in the interpolation apparatus of FIG. 3.

FIG. 4 illustrates a memory segmentation scheme within the coefficient buffer 14 used to accommodate the precalculated coefficients required for the calculations. As shown, a first memory segment 22 is provided for precalculated weighting coefficients for sharp interpolation, a second memory segment 24 is provided for coefficients for smooth interpolation and a third memory segment 26 is provided for contrast detection. In this particular example, the smooth interpolated value is also used to approximate a density measurement. In addition, a fourth memory segment 28 is provided for 100% or one-to-one interpolation, i.e. where no enlargement or reduction of the image takes place. During one-to-one interpolation, the segment 28 is accessed rather than the segments 22, 24 and 26. The memory segment 28 is further subdivided into three tables which represent the same types of coefficients as the segments 22, 24 and 26, but without enlargement or reduction. This arrangement provides for added flexibility which allows the image to be sharpened or smoothed while the size remains unaltered.

The interpolation logic 16 performs the actual image interpolation calculations through a series of convolutions of coefficient weighting factors (using 4×4 kernels) and input image buffer data, such as described, for example, in U.S. Pat. No. 4,578,812. However, as speed becomes less of an issue, more accurate interpolation values can be calculated using larger interpolation kernels, e.g. 6×6, etc. Following interpolation, the resulting values are passed to the DSP controller 18 for adaptive selection.

The prestored lookup tables 20 which are accessible from the DSP controller 18 contain tables each of which describe a relationship between the image contrast or density values and the desired degree of sharpness corresponding to each of those values. A total of six tables are used in the present example where three color channels are involved:

three contrast tables, being one corresponding to each color channel and used to derive a sharpness weighting or scale factor for each channel corresponding to a contrast value for each channel;

three density tables, being one corresponding to each color channel and used to derive a sharpness weighting or scale factor for each channel corresponding to a density measurement for each channel (represented by the smooth or Y values in the present example);

The interpolation algorithm processes each color channel independently. All contrast, density (or other) interpolated values and derived table scaling factors are individually selectable for each channel.

Although the six tables 20 are independent and each describe a relationship between an image characteristic value and a scaling factor, it is possible to expand the implementation to allow for channel interdependencies. For example, the three density values could be used to access one of three three-dimensional tables containing the scaling factors. This would allow sharpening in a particular channel based upon the combined densities and thus could isolate particular color areas for smoothing or sharpening. Using one-, two-, three- or even four-dimensional tables, it will be appreciated that a number of measures or interdependencies could be accommodated.

Figure 5:
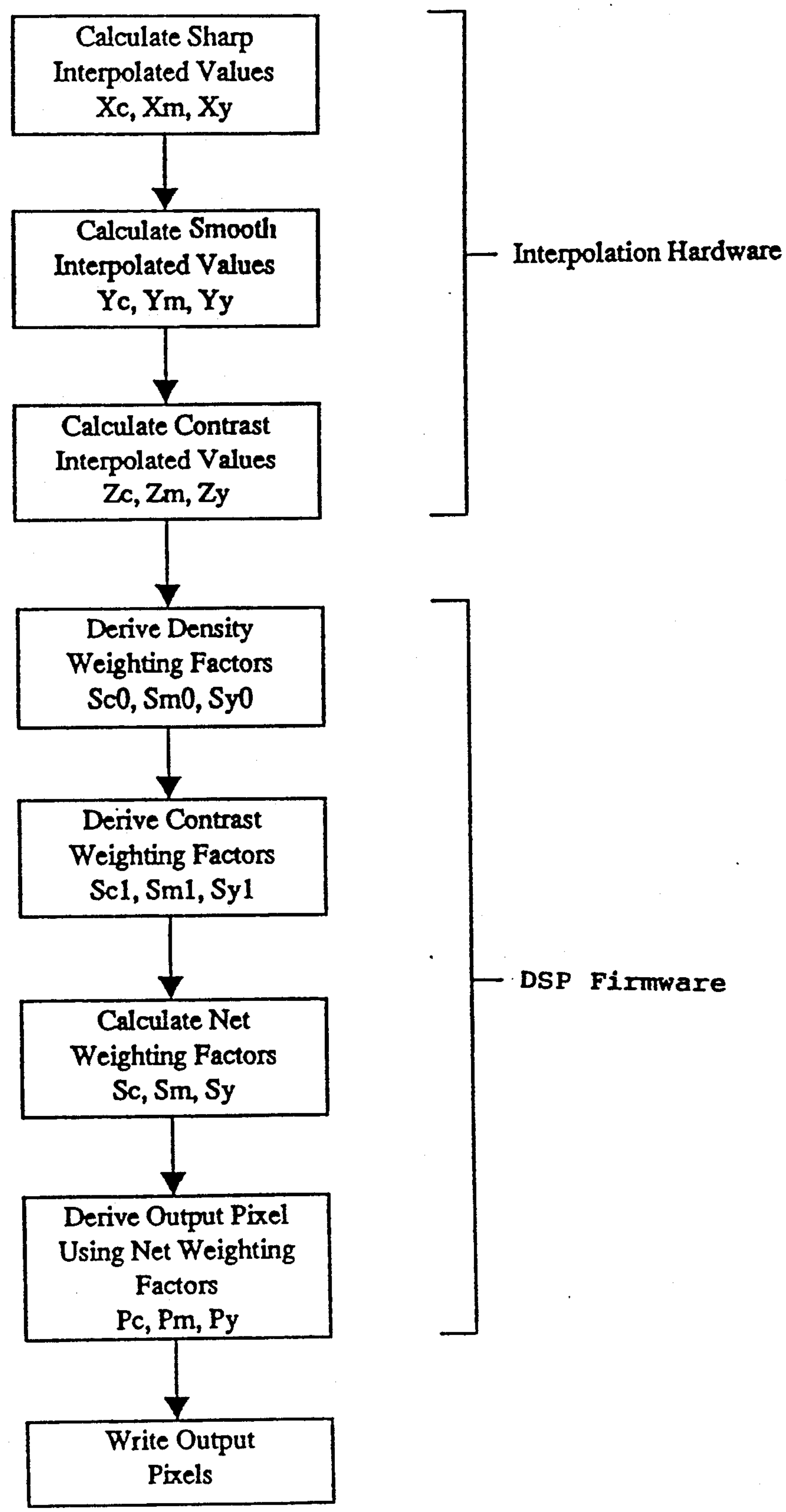
FIG. 5 is a flow diagram illustrating the operation of apparatus implementing the interpolation algorithm according to the invention.

The implementation of the algorithm will now be described in more detail below, with reference to FIG. 5.

For flexibility, the controller 18 is implemented in firmware which runs on a Motorola DSP 56001 microcontroller. While real-time hardware provides interpolated data as required, the firmware controls the continuum selection and adaptivity process.

The implementation comprises two modules:

(a) real-time hardware (the interpolation logic 16) to provide interpolated data as required; and (b) algorithm functional implementation (the DSP controller 18).

The steps used to implement the algorithm are as follows:

1) The interpolation logic 16 is used to calculate the sharp interpolated values: $X_cX_mX_y$; the soft interpolated values: $Y_cY_mY_y$; and the contrast values: $Z_cZ_mZ_y$.

2) The calculated values are fed to the DSP controller 18 for each color channel.

3) Weighting or scale factors are derived to represent a measure of local image density for each channel: $S_{c0}S_{m0}S_{y0}$. These factors are obtained by referencing density lookup tables using image density values, such as those shown in FIGS. 7 and 11. In the present example, the soft values $Y_cY_mY_y$ are used to approximate the density, which is normally obtained by averaging a local image space. This approximation is employed due to speed constraints.

A total of three one-dimensional density lookup tables are used to independently map each soft interpolation value, corresponding to one of the three color channels, to a weighting or scale factor. The prestored table buffer 20 illustrated in FIG. 3 contains these factors and is accessed in real-time during image interpolation. The factors are predetermined and stored in the buffer 20 prior to initiating image interpolation.

Figure 8:
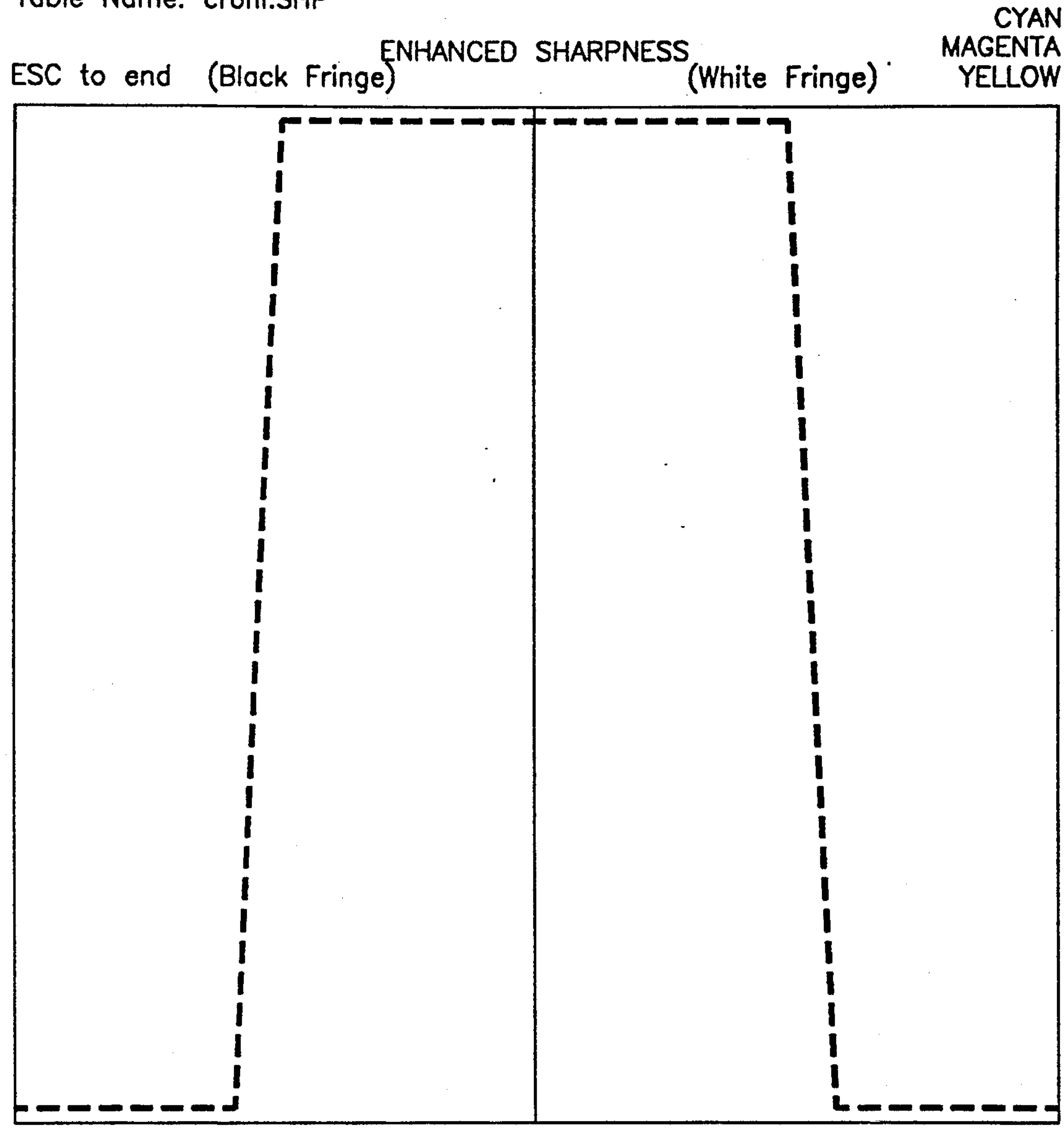
FIG. 8 is a graphical illustration of a lookup table in which a sharpness reduction is effected at high contrast in both black and white fringe areas of an image.
Figure 9:
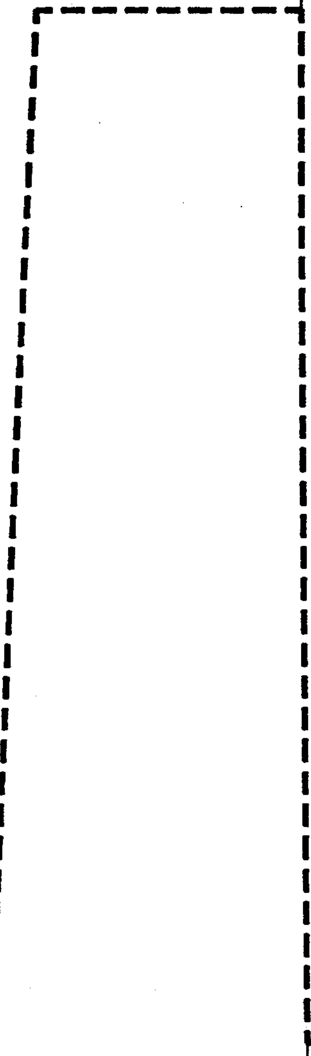
FIG. 9 is a graphical illustration of a lookup table similar to the one shown in FIG. 8, but in which only the lower contrast black fringe areas are enhanced in sharpness, all other regions being smoothed.

4) Weighting or scale factors are derived to represent a measure of local image contrast for each channel: $S_{c1}S_{m1}S_{y1}$. The factors are determined by looking up input contrast values in contrast lookup tables, such as shown in FIGS. 8 and 9, which correspond to the three color channels, as in the previous step. In the present example, unlike the density input values, the contrast values $Z_cZ_mZ_y$ are generated by the hardware in addition to the soft and sharp interpolated values.

A total of three one-dimensional lookup tables are used to independently map each contrast interpolation value, corresponding to one of the three color channels, to a weighting factor. Similar to the density weighting factors, the contrast values are retrieved from lookup tables which are stored in the prestored table buffer 20 illustrated in FIG. 3.

5) The net scale factors, $S_cS_mS_y$, are calculated. The scale factors are derived from the contrast and density weighting coefficients:

$$S_c = S_{c0} \times S_{c1}$$

$$S_m = S_{m0} \times S_{m1}$$

$$S_y = S_{y0} \times S_{y1}$$

In the present example factors are derived from variables which represent characteristics of the input image, in this case, contrast and density. However, it will be appreciated that the number of variables need not be restricted to two and the methods of combining the individual variables to produce a net scaling factor are not restricted to the methods described in the above equations of the present example.

6) Calculate the output pixels: $P_cP_mP_y$.

$$P_c = S_cX_c + (1 - S_c)Y_c$$

$$P_m = S_mX_m + (1 - S_m)Y_m$$

$$P_y = S_yX_y + (1 - S_y)Y_y$$

Figure 12:
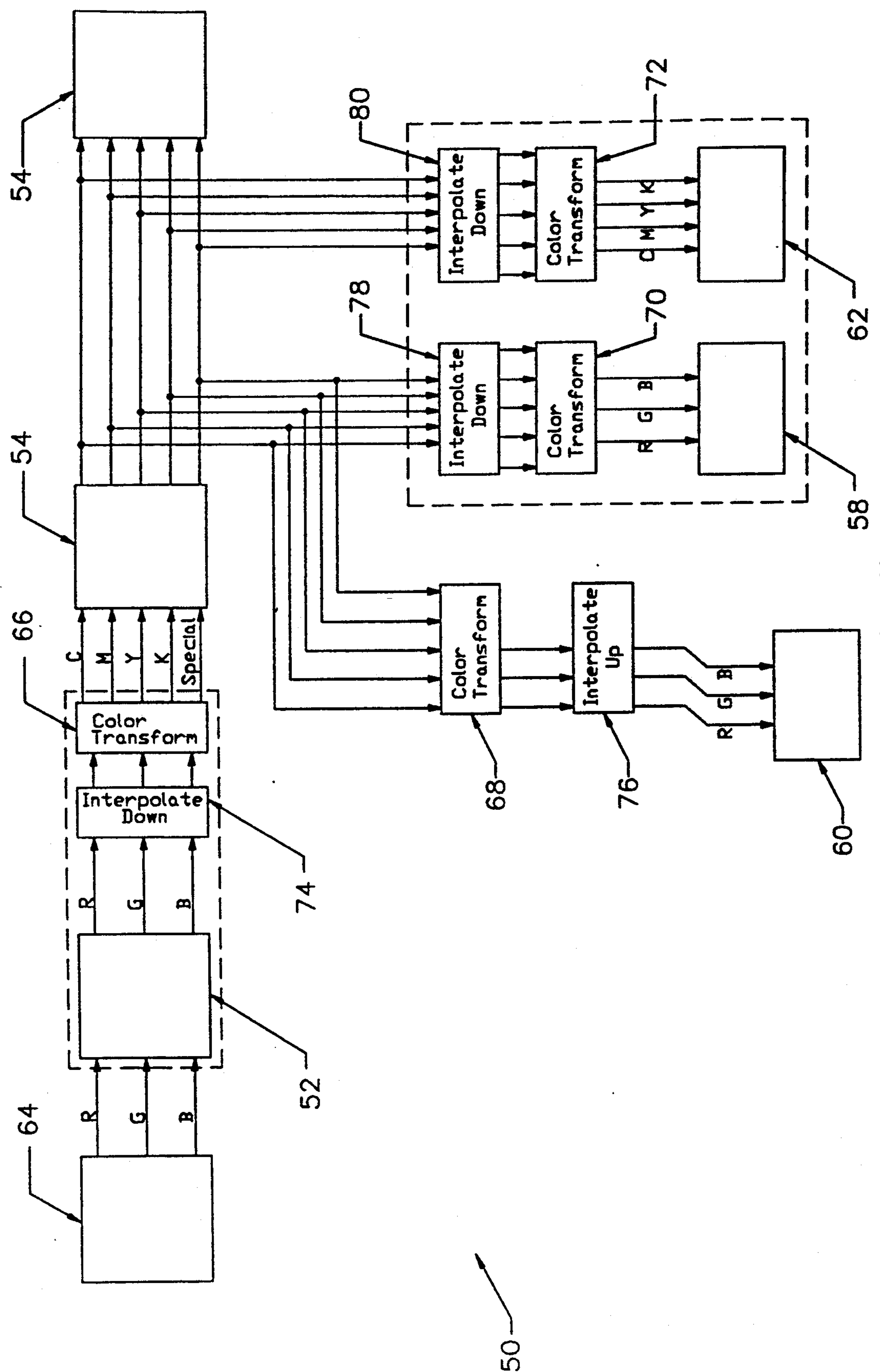
FIG. 12 is a diagrammatical illustration of interpolation apparatus according to the invention coupled with color transform apparatus.

7) Write output pixels to color transform unit, in applications where the interpolation apparatus 10 is coupled with color transform apparatus as shown in FIG. 12.

The weighting factors referred to in steps 3 and 4 above are derived from lookup or reference tables for two reasons:

To allow control of the degree of sharpness and softness in the interpolated outputs based upon local image content, i.e. density and contrast; and Reference tables provide an easy method of interpreting the input contrast and density values to generate output factors within a number range such that $$0 \leqq S \leqq 1$$

Examples of how a user can tailor the sharpness of the interpolated output image are given below with reference to FIGS. 6 to 11.

Figure 6:
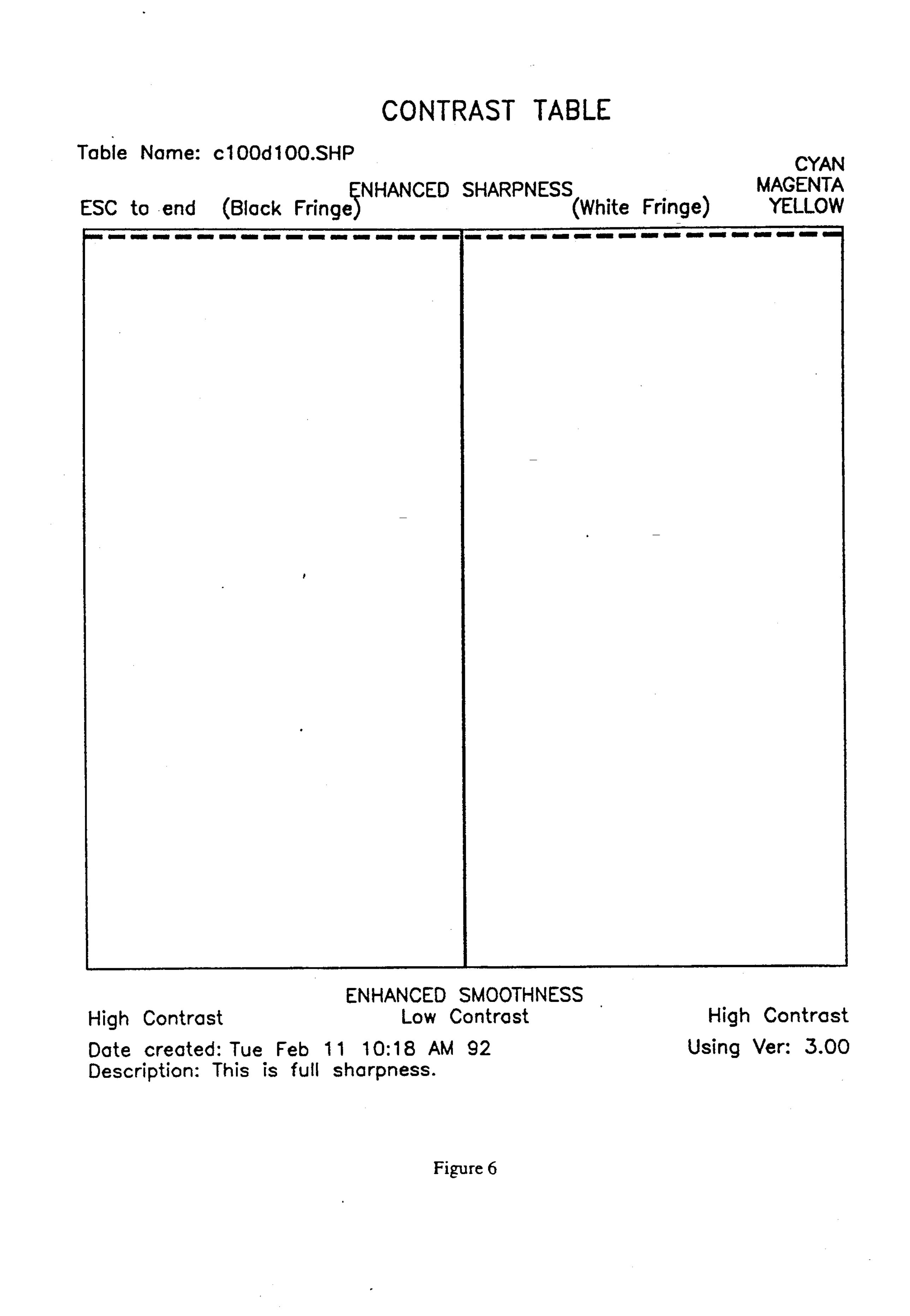
FIG. 6 is a graphical illustration of a lookup table which represents the degree of output image sharpness corresponding to image contrast.

FIG. 6 illustrates a lookup table where full output image sharpness is independent of local image contrast. Therefore, the sharpness setting is global, in this particular instance. The graph illustrates the degree of image sharpness versus contrast and it is divided into two halves: the left side denoting "undershoot" or "negative overshoot" or "black fringe" contrast, and the right side denoting "overshoot" or "positive overshoot" or "white fringe" contrast. The horizontal scale denotes the degree of contrast, low to high, for each type of overshoot. The vertical scale denotes the degree of sharpness running from full sharpness (or "enhanced smoothness") to full sharpness (or "enhanced sharpness"). It should be noted that the degree of sharpness is relative and also depends on the sharpness versus density relationship, i.e. there is also a density lookup table, such as the table shown in FIG. 7, which will be used in conjunction with this table.

Figure 7:
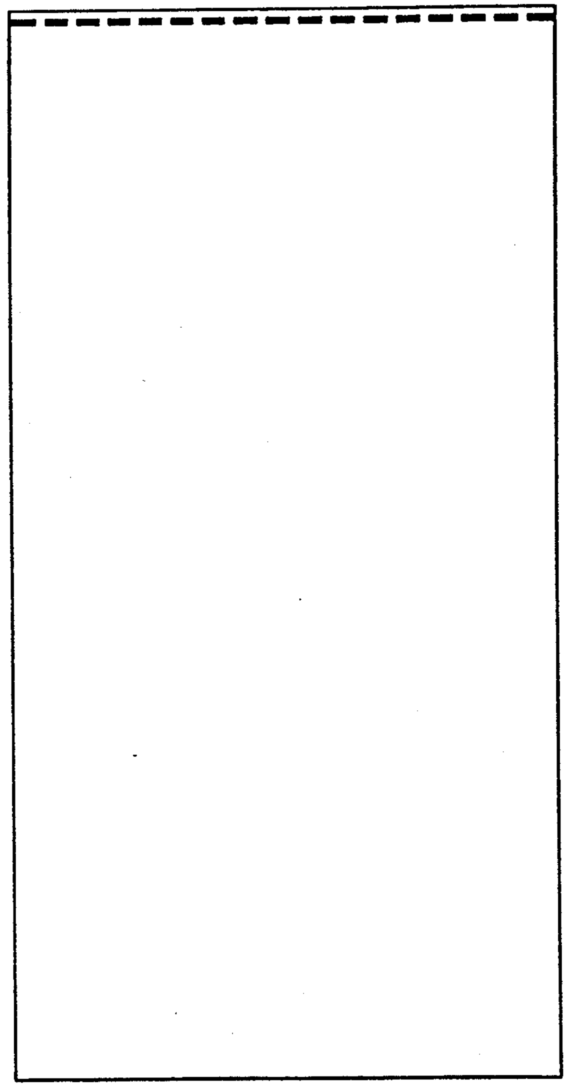
FIG. 7 is a graphical illustration of a lookup table which represents the degree of output image sharpness corresponding to image density.

FIG. 7 shows a lookup table representing the degree of output image sharpness corresponding to density. The horizontal scale denotes the degree of density, low to high, plotted against a vertical scale which denotes the degree of sharpness running from full smoothness to full sharpness. It should again be noted that the degree of sharpness is relative and also depends on the sharpness versus contrast relationship. Thus, a contrast table will be used in conjunction with this table, e.g. the table shown in FIG. 6.

FIG. 8 illustrates a lookup table with sharpness reduction at high contrast in both the black and white fringe areas. The density table, for use in association with this table can be identical to FIG. 7 if full sharpness denoted in this graph for the lower contrast areas is the maximum sharpness available from the interpolation. Application of this lookup table will result in full enhanced sharpness, except in higher contrast regions, which will be enhanced to full smoothness. This is useful in reducing high contrast ringing or fringing.

FIG. 9 is similar to FIG. 8 except that only the lower contrast black fringe regions are enhanced in sharpness. All other regions are softened. This is useful in reducing the low contrast noise while preserving or enhancing image sharpness.

Figure 10:
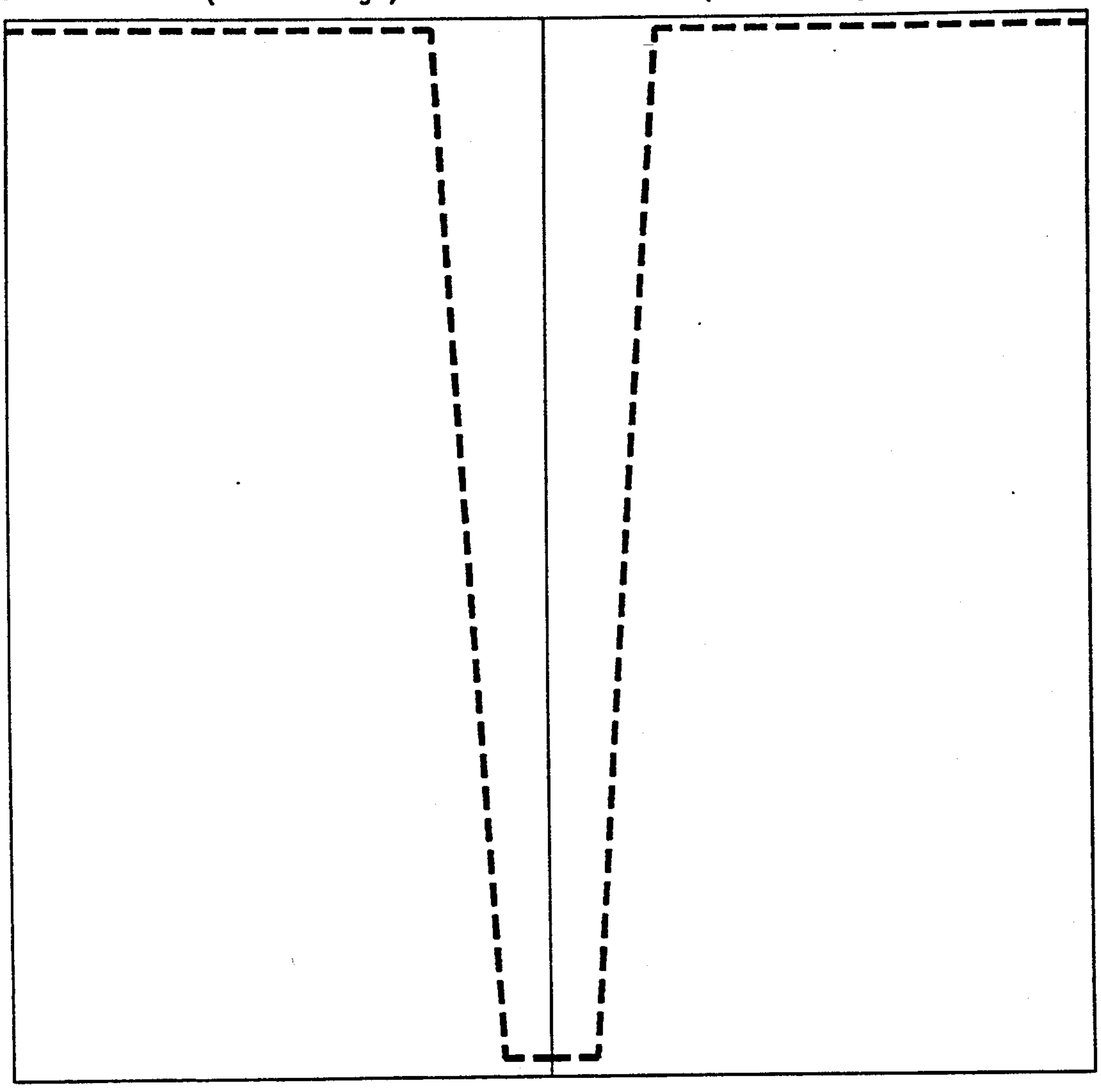
FIG. 10 is a graphical illustration of a lookup table in which smoothness is enhanced at low contrast in both black and white fringe regions, all other regions being at enhanced sharpness.

FIG. 10 illustrates a lookup table with enhanced smoothness at low contrast in both black and white fringe regions. All other regions are at enhanced sharpness. This is useful to more effectively reduce white fringing including that which may already exist in the original image, while maintaining image detail or enhancing sharpness.

Figure 11:
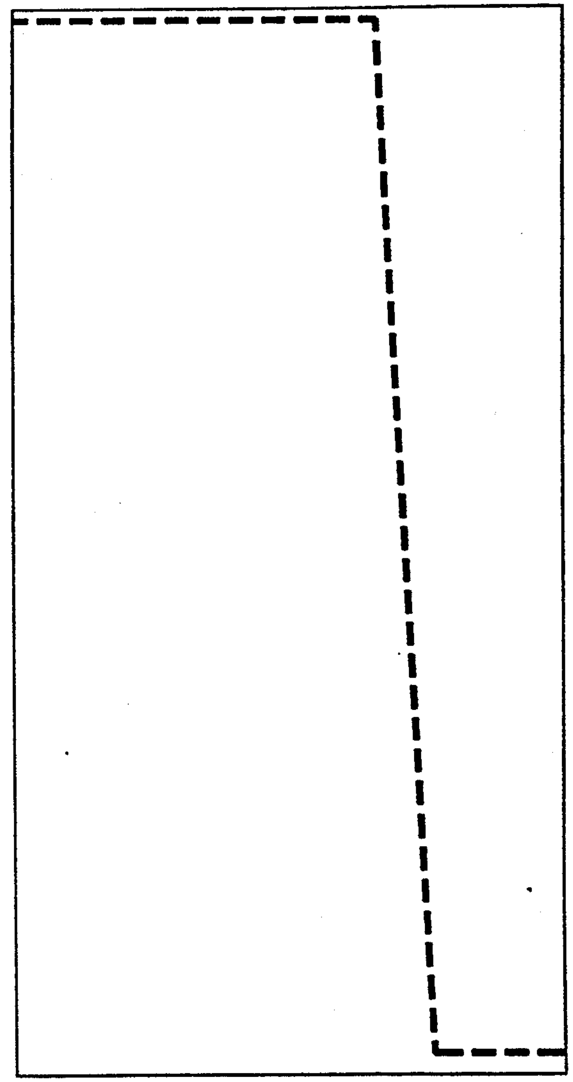
FIG. 11 is a graphical illustration of a lookup table similar to the one shown in FIG. 7, except that sharpness is reduced for areas of high image density.

The lookup table illustrated in FIG. 11 will result in full enhanced sharpness for low density areas. It is useful in reducing high density film and/or input scanner noise.

In practice the contrast and density lookup tables referred to above will be combined in one lookup table, which is predetermined (usually by the user) and prestored in the interpolator hardware. Thus, the lookup table will contain two portions: a contrast versus sharpness table and a density versus sharpness table. This enables the two relationships to be treated interdependently.

Instead of the relationships shown in the above-mentioned graphical illustrations, any other relationship could be used to achieve whatever sharpness is desired for a particular input image.

In a typical application, digital image interpolation is used in computer assisted color printing operations during page planning. Such a system would then typically include a color transform system (such as described in our co-pending U.S. application Ser. No. 07/531,897) so that color transforms, e.g. from CMY (cyan, magenta, yellow) to RGB (red, green, blue) can be effected in conjunction with interpolation. FIG. 12 illustrates a color printing installation, generally indicated at 50, incorporating interpolation hardware according to the present invention, in block diagram form.

The installation 50 comprises an input device, such as a scanner 52, a page composition system 54 for manipulating a scanned image and a color printing device 56.

The installation 50 also includes proofing devices for viewing intermediate results prior to final printing, such as a monitor 58 (at low resolution), a digital film recorder 60 (at high resolution) and an ink jet printer 62. A color transparency which is input into the system is shown at 64.

The fact that the above-mentioned different devices in the printing installation work with different color space descriptions, such as red, green, blue (RGB) or cyan, magenta, yellow, black (CMYK) plus, in some instances, further special colors, as well as different spatial resolutions, requires the use of color converters and interpolators between the devices.

The color converters are indicated at 66, 68, 70 and 72 and the interpolators are indicated at 74, 76, 78 and 80.

Thus, the color converter 66 and interpolator 74 are located between the scanner 52 and the page composition system 54 for color transform and interpolation between the RGB and CMYK color spaces. Similarly, the color converters 70 and 72 and the interpolators 78 and 80 are located between the page composition system 54 and the monitor 58 and ink jet printer 62. In all these applications, interpolation is carried out prior to color transformation.

The converter 68 and interpolator 76 are located between the page composition system 54 and the digital film recorder 60. In this application, interpolation is effected after color conversion so that only three color channels need be contended with during interpolation.

Many further modifications beyond those set out herein will readily occur to those skilled in the art and, therefore, the embodiments described should be considered as illustrative only and not be as limiting the scope of the invention as construed in accordance with the accompanying claims.

What is claimed is:

1. A method of reproducing an original image as an interpolated output image in which the original image is represented by digital input pixel data, said method comprising the steps of:

(a) loading the input pixel data into an input buffer;

(b) providing a coefficient buffer having a first memory segment loaded with a first set of precalculated interpolating coefficients, a second memory segment loaded with a second set of interpolating coefficients and a third memory segment loaded with a set of image characteristic coefficients;

(c) selecting a local position within said original image for interpolation;

(d) respectively addressing said first and second memory segments by means of input pixel data corresponding with said selected local position to respectively obtain first and second interpolated output image pixels;

(e) addressing the third memory segment by means of input pixel data corresponding with said selected local position to obtain an input image characteristic value;

(f) calculating a resultant output image pixel by combining said first and second interpolated output image pixels as a function of said input image characteristic value;

(g) selecting another local position within said original image for interpolation;

(h) repeating the steps (d) to (f) to obtain a further resultant output image pixel; and (i) repeating said steps for further local positions to produce a collection of resultant output image pixels forming said interpolated output image.

2. A method according to claim 1, wherein said first set of interpolating coefficients comprises weighting coefficients of a first interpolation algorithm producing a relatively sharp result and said second set of interpolating coefficients comprises weighting coefficients of a second interpolation algorithm producing a relatively soft result.

3. The method according to claim 1, further comprising the steps of:

obtaining, in addition to said first and second interpolated output image pixels in step (d), a third interpolated output image pixel;

in addition to said input image characteristic value in step (e), selecting a further input image characteristic value; and in addition to said resultant output image pixel in step (f), calculating a further resultant output image pixel by combining said resultant output image pixel and said third interpolated output image pixel as a function of said further input image characteristic value.

4. The method according to claim 3, wherein said resultant output image pixel is calculated according to the algorithm:

$$P=SX+(1-S)Y$$

where

P represents said resultant output image pixel;

X represents said first interpolated output image pixel;

Y represents said second interpolated output image pixel; and

S represents a scaling factor, with a value of from 0 to 1, derived from said input image characteristic value, and wherein said further resultant output image pixel is calculated by using the algorithm:

$$P'=S'W+(1-S')P$$

where P′ represents said further resultant output image pixel; W represents said third interpolated output image pixel and S′ represents a further scaling factor with a value from 0 to 1, derived from said further input image characteristic value.

5. The method according to claim 1, wherein said first set of interpolating coefficients comprises a set of precalculated values of said first interpolated output image pixel and said second set of interpolating coefficients comprises a set of precalculated values of said second interpolated output image pixel.

6. The method according to claim 2, wherein said resultant output image pixel is calculated according to the algorithm:

$$P=SX+(1-S)Y$$

where

P represents said resultant output image pixel;

X represents said first or sharp interpolated output image pixel;

Y represents said second or soft interpolated output image pixel; and

S represents a scaling factor, with a value of from 0 to 1, derived from said input image characteristic value.

7. The method according to claim 6, wherein said input image is a colored image comprising a number of basic colors and further comprising the step of providing a multidimensional lookup table, the number of dimensions corresponding with said number of basic colors, said lookup table mapping input image characteristic values for each one of said basic colors to a corresponding value for said scaling factor.

8. The method according to claim 7, wherein said number of basic colors is three.

9. The method according to claim 7, wherein said number of basic colors is four.

10. The method according to claim 6, wherein said scaling factor S is derived from two separate input image characteristic values.

11. The method according to claim 10, wherein said two separate input image characteristic values comprise input image contrast and input image density at said local position in said input image.

12. The method according to claim 11, wherein said input image contrast is generated from said input image data by convolving a set of contrast weighting coefficients with said input image data.

13. The method according to claim 12, wherein said input image density is taken to be proportional to said relatively soft interpolated output image pixel.

14. The method according to claim 12, wherein said input image density is derived from said input image data.

15. The method according to claim 10, further comprising the step of providing lookup tables mapping said input image characteristic values to corresponding values for said scaling factor.

16. The method according to claim 15, wherein said lookup tables comprise two one-dimensional lookup tables mapping input image contrast and density, respectively, to corresponding intermediate values for said scaling factor and the method further comprises the step of multiplying said intermediate values together to produce said scaling factor.

17. The method according to claim 1, wherein said input image characteristic value comprises input image contrast.

18. The method according to claim 1, wherein said input image characteristic value comprises input image density.

19. The method according to claim 1, further comprising the step of deriving a second image characteristic value from said input pixel data and calculating said resultant output pixel by combining said first and second output image pixels as a function of said first and second image characteristic values.

20. The method according to claim 19, wherein said first and second characteristic values comprise values representing image contrast and density, respectively.

21. Digital image processing apparatus for interpolating a digital input image into an interpolated output image, comprising:

an input buffer for accommodating pixel data of said input image;

a coefficient buffer for storing pre-calculated interpolation weighting coefficients prior to real time image interpolation and comprising a first memory segment for containing a set of pre-calculated relatively sharp interpolating weighting coefficients obtained by using a relatively sharp interpolating algorithm; a second memory segment for containing a set of pre-calculated relatively soft weighting coefficients obtained by using a relatively soft interpolating algorithm; and a third memory segment for containing a set of pre-calculated weighting coefficients representative of a predetermined characteristic of said input image, and image convolution and interpolation means for calculating a relatively sharp interpolated output image pixel using said input pixel data and said set of relatively sharp weighting coefficients and for calculating a relatively soft interpolated output image pixel using said input pixel data and said set of relatively soft weighting coefficients and for calculating a value for said image characteristic using said input pixel data and said image characteristic weighting coefficients and for calculating a resultant output pixel by combining said relatively sharp and said relatively soft output image pixels as a function of said characteristic value.

22. The apparatus according to claim 21, wherein said coefficient buffer further comprises a fourth memory segment for containing precalculated interpolation coefficients for effecting constant interpolation coefficients for effecting constant image size interpolation.

23. Digital image processing apparatus for interpolating a digital input image into an interpolated output image, comprising:

an input buffer for accommodating pixel data of said input image;

means for locating a local position within said input image for interpolation;

means for obtaining a first interpolated output image pixel at a predetermined pixel position in said interpolated output image;

means for obtaining a second interpolated output image pixel at said predetermined pixel position, means for deriving an input image characteristic value from said input image pixel data; and means for calculating a resultant output image pixel at said predetermined position in said output image by combining said first and second interpolated output image pixels as a function of said input image characteristic value.

24. The apparatus according to claim 23, wherein said first interpolated output image pixel is obtained by the application of a first interpolation algorithm producing a relatively sharp result and said second interpolated output image pixel is obtained by the application of a second interpolation algorithm producing a relatively soft result.

25. The apparatus according to claim 24, wherein said resultant output image pixel is calculated according to the algorithm:

$$P = SX + (1 - S)Y$$

where

P represents said resultant output image pixel;

X represents said first or sharp interpolated output image pixel;

Y represents said second or soft interpolated output image pixel; and

S represents a scaling factor, with a value of from 0 to 1, derived from said input image characteristic value.

26. The apparatus according to claim 25, wherein said means for deriving an input image characteristic is adapted to derive values for image contrast and image density.

27. The apparatus according to claim 26, further comprising lookup tables for obtaining said scaling factor S as a function of said image contrast and image density values.

28. The apparatus according to claim 27, further comprising a coefficient buffer containing a set of contrast detector mask coefficients for deriving said image contrast value.

29. The apparatus according to claim 28, wherein said coefficient buffer further contains a set of precalculated sharp interpolating weighting coefficients obtained by interpolating weighting coefficients obtained by using said relatively sharp interpolation algorithm, a set of precalculated relatively soft weighting coefficients obtained by using said soft interpolating algorithm.

30. The apparatus according to claim 23, further comprising means for obtaining a third interpolated output image pixel at said predetermined pixel position in said output image;

means for deriving a further input image characteristic value from said input image pixel data; and means for calculating a further resultant output image pixel at said predetermined pixel position in said output image by combining said first resultant output image pixel and said third interpolated output image pixel as a function of said further input image characteristic value.

31. The apparatus according to claim 30, wherein said resultant output image pixel is calculated according to the algorithm:

$$P = SX + (1-S)Y$$

where

P represents said resultant output image pixel;

X represents said first interpolated output image pixel;

Y represents said second interpolated output image pixel; and

S represents a scaling factor with a value of from 0 to 1, derived from said input image characteristic value, and wherein said further resultant output image pixel is calculated by using the algorithm:

$$P' = S'W + (1-S')P$$

where P' represents said further resultant output image pixel; W represents said third interpolated output image pixel and S' represents a further scaling factor with a value from 0 to 1, derived from said further input image characteristic value.

32. The apparatus according to claim 23, further comprising a buffer containing a set of said first interpolated output image pixels and a set of said second interpolated output image pixels for accessing by said means for obtaining first and second interpolated output image pixels to select one value from each one of said sets.

* * * * *